United States Patent [19]
Bodapati et al.

[11] Patent Number: 5,483,325
[45] Date of Patent: Jan. 9, 1996

[54] FRAME FOR MOUNTING PLURAL SHEETLIKE SMALL ORIGINALS FOR SIMULTANEOUS SCANNING/COPYING

[76] Inventors: Chandra Bodapati; Kamalarathnam Cherukure, both of c/o CypherTech; 250 E. Carribean Dr., Sunnyvale, Calif. 94089

[21] Appl. No.: 228,276

[22] Filed: Apr. 15, 1994

[51] Int. Cl.6 ................................................ G03G 21/00
[52] U.S. Cl. .................................... 355/230; 355/75
[58] Field of Search ............................... 355/230, 75, 46, 355/54, 74

[56] References Cited

U.S. PATENT DOCUMENTS

| | | | |
|---|---|---|---|
| 4,315,687 | 2/1982 | Bretters et al. | 355/75 |
| 4,783,679 | 11/1988 | Anzai | 355/75 X |
| 4,891,667 | 1/1990 | Bruce et al. | 355/230 |

*Primary Examiner*—Matthew S. Smith

[57] ABSTRACT

An accessory frame capable of being removably mounted on a photocopier or an electronic flatbed scanner for copying/scanning operations, having predetermined apertures to facilitate locating and removing sheetlike small originals like business cards or index cards with ease.

8 Claims, 5 Drawing Sheets

FRAME FOR MOUNTING PLURAL SHEETLIKE SMALL ORIGINALS FOR SIMULTANEOUS SCANNING/COPYING

BACKGROUND

1. Field of Invention

The present invention relates to an electronic flat-bed scanner or an electrophotographic copy machine.

BACKGROUND

In the past special purpose copying machines were designed with the aim of copying from multiple sheetlike small originals in one pass, with, all originals onto one single copy paper or one original each onto one single copy paper. Such machines have been patented in U. S. Pat. Nos. 4,315,687 dated 16th Feb. 1982 and 4,783,679 dated 8th Nov. 1988 respectively. The former envisaged an elaborate special purpose photocopying machine and has special assemblies for arranging the originals, transporting the arranged originals onto the original setting table, special electric signalling arrangement for feeding the copy paper, arrangement for retrieval of the originals after copying. The use of this design was thus limited to a few uses like producing multiple prize winning credit notes onto one paper, lotto game forms etc. The latter machine envisaged a special reciprocating original setting table coloured black with an original setting plate placed on it, suited to accommodate without restraint 4 originals for copying. An elaborate timing arrangement to deliver sequentially copy paper to allow copying the said 4 originals on 4 different copy papers, each copy made by only one exposure pass in all i.e. each original copied on to one copy paper. Such a machine besides proving more expensive than a standard conventional machine, is limited to copy multiple small originals such as post cards or business cards on to a corresponding multiple copy papers. It follows that if one large original were to be placed on the setting table, occupying the same area as the 4 small originals, only 4 small different portions of the large original would be copied on each of the 4 copy papers. Thus the machine is limited to a special application and not suited to an ordinary and popular application of copying large originals of sizes of 11"×8.5" and larger.

Conventional, designs of various makes, of copying machines of the photostatic type, of scanners of the electronic flat-bed scanners type are already in widespread use. Basically such optical devices expose the original documents to be copied to light rays, through a transparent glass plate and transfer the image from the original document to single copy paper or as data to the personal computer data bank as the case may be. The operation of the conventional copy machine or scanner is so well known as not to need any detailed discussion here. In order to understand the present invention, all that is required is to realize that these devices have a transparent, clear, flat invariably a glass support surface, with a designated edge or right-angled edges, provided on one or more of the components of the device, the original document to be copied is supported face down on such surface, butting against the designated edge/edges whether they be loose paper sheets, thin or thick cards, elongated strips, or even three dimensional objects such as books. Multiple, particularly small originals like postcards or business cards could be copied using a conventional, standard copying machine on to one copy paper by arranging them on the original setting table by aligning the leading edge widthwise of each original in the first row with the designated edge on the original setting table with the lengthwise edges of the cards butting each other. A second row of originals can be placed, space permitting, butting each trailing widthwise edge of the originals in the first row with the lengthwise edges butting each other as in the first row as shown in FIG. 5. Thus at least 10 business cards of U.S. standard size 2"×3.5" could be arrayed on the original setting table to produce a copy of all the 10 cards on a single copy paper of standard size 11"×8.5". The operator, however, is required to spend a great deal of time when consideration is given to the requirement of arranging the thin cards to butt each other widthwise and lengthwise without overlap or gap, particularly if some cards are bent. Further since there is no restraint on the cards placed in the array, a risk of their displacement from the array, exists, if the operator does not close the cover very slowly to avoid air turbulence on the glass surface. Further the 10 originals of the first lot have to be picked up from the original setting table, which is invariably a flat smooth glass plate and stacked before placing the second lot of 10 cards. This again entails considerable time and effort since the cards are thin and lie flat on the smooth surface of the original setting table, leading to operator fatigue and boredom when about 300 to 400 cards are required to be copied. The foregoing is also true in the case of scanning these multiple small originals on a conventional, standard electronic flat-bed scanner which has a similiar original setting table in size and construction i.e. a flat, smooth glass plate. original setting table in size and construction i.e. a flat, smooth glass plate.

OBJECTS and ADVANTAGES

It is the principal objective of the present invention to provide, an extremely low cost, versatile, novel, and simple accessory frame which can be used on a conventional, standard photocopier as well as an electronic flat-bed scanner which can be easily and quickly mounted firmly without shifting, on the original setting glass plate or platen as it is called, whenever desired, to facilitate a special mode of operation of copying/scanning plural sheetlike small originals like post cards or business cards and capable of being removed from the afore mentioned devices with least, effort, skill and time, without disfiguring the original setting glass plate or glass platen, to revert the machine to ordinary mode of operation i.e. copying/scanning big originals, forthwith.

It is another object of the present invention to provide an accessory frame for use on a conventional, standard photocopier as well as a conventional, standard electronic flat-bed scanner, which is simple in, construction and manufacture and easy to be mounted or removed at will, on or from the original setting glass platen of either of the copying and or scanning devices with least effort or skill.

It is a further object of the present invention to provide an accessory frame for use on a conventional, standard photocopier as well as a conventional standard electronic flat-bed scanner, the said frame being designed specifically to adhere to the original setting glass platen and remain stationary, by withstanding the lateral and longitudinal forces usually encountered when the small originals are located into and later removed from predetermined apertures in the accessory frame, for copying/scanning operations. At the same time the said frame should prove easy to remove/lift when it is desired to remove it altogether from the devices without disfiguring, or leave traces on, the smooth surface of the glass platen as to enable the devices to be reverted to ordinary mode of operations i.e. copying/scanning of big originals.

It is a still further object of the present invention to provide an accessory frame for use on a conventional, standard photocopier as well as a conventional standard electronic flat-bed scanner, with means to position with ease and without much skill, the small originals without overlapping without much skill and also to restrain them from being shifted by the induced air turbulence, during the period when the hold-down cover is closed just before actual copying/scanning by providing suitable edges.

It is a still further object of the present invention to provide an accessory frame for use on a conventional, standard photocopier as well as a conventional standard electronic flat bed scanner by providing for an infallible means to easily, quickly and without much skill or dexterity, to retrieve the small originals from the frame. It is a still further object of the present invention to provide an accessory frame for use on a conventional, standard photocopier as well as a conventional standard electronic flat-bed scanner by providing a means to extricate a small original located on the frame for copying/scanning, contingent to one edge stuck in between the frame and original setting glass/glass platen.

It is a still further object of the present invention to provide an accessory frame for use on conventional, standard photocopier as well as a conventional standard electronic flat-bed scanner by providing for a means to easily and without much skill, to locate & retrieve small originals even if the said originals are already bent concave or convex with respect to the side on which the matter to be copied/scanned exists.

Yet further derivatives and advantages will become apparent from a consideration of the ensuing description and drawings which are given by way of illustration only, and thus are not limited to the present invention.

DRAWING FIGURES

Figure 3:
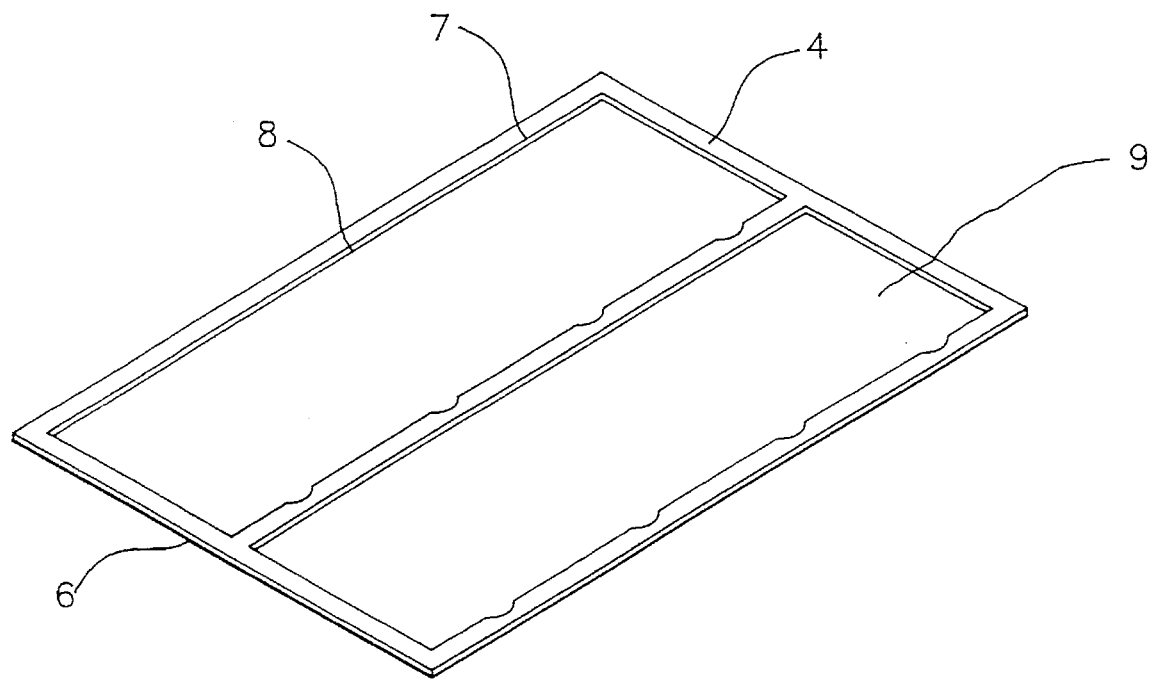
FIG. 3 is the perspective view of the accessory frame of the present invention as a second embodiment for locating 10 cards.
Figure 2:
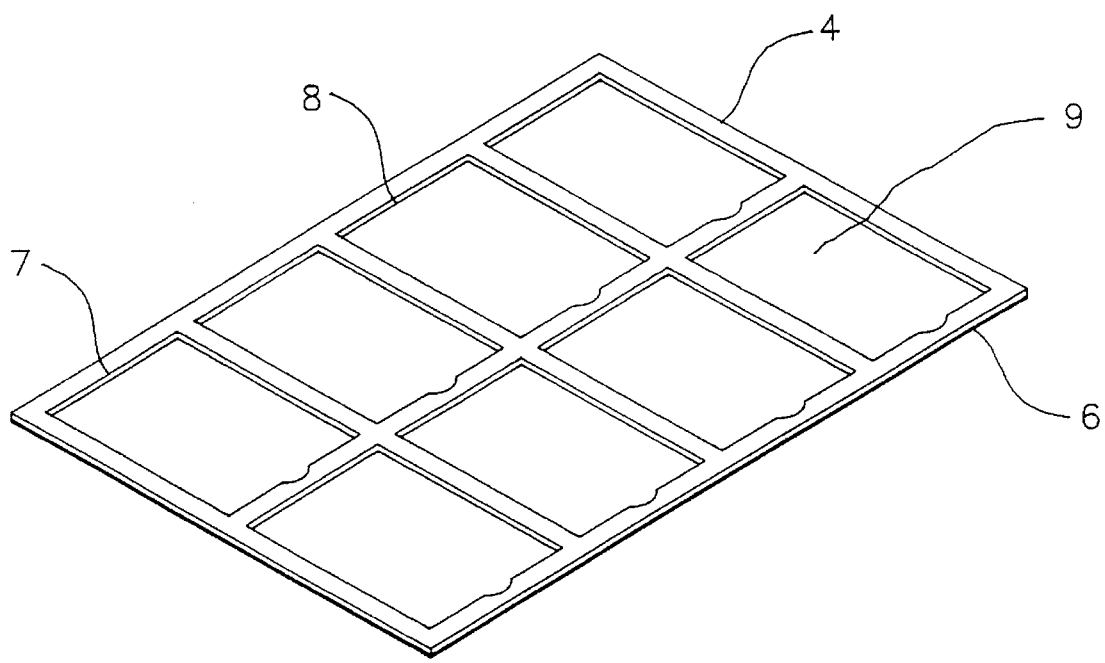
FIG. 2 is the perspective view of the accessory frame of the present invention as a first embodiment, for locating 8 cards.
Figure 4B:
Figure 4A:
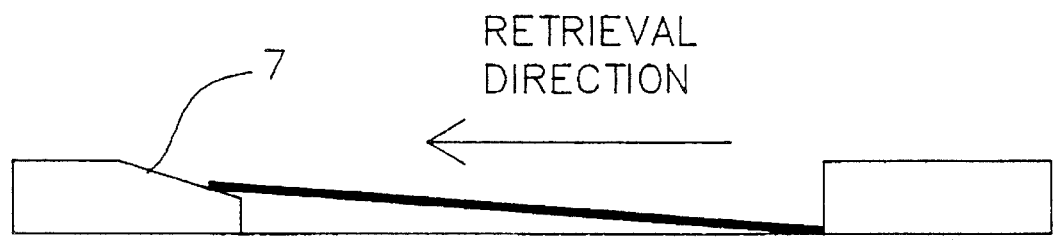

FIG. 4(A) and (B) is the cross sectional view at AA of FIGS. 2 and 3

Figure 4C:
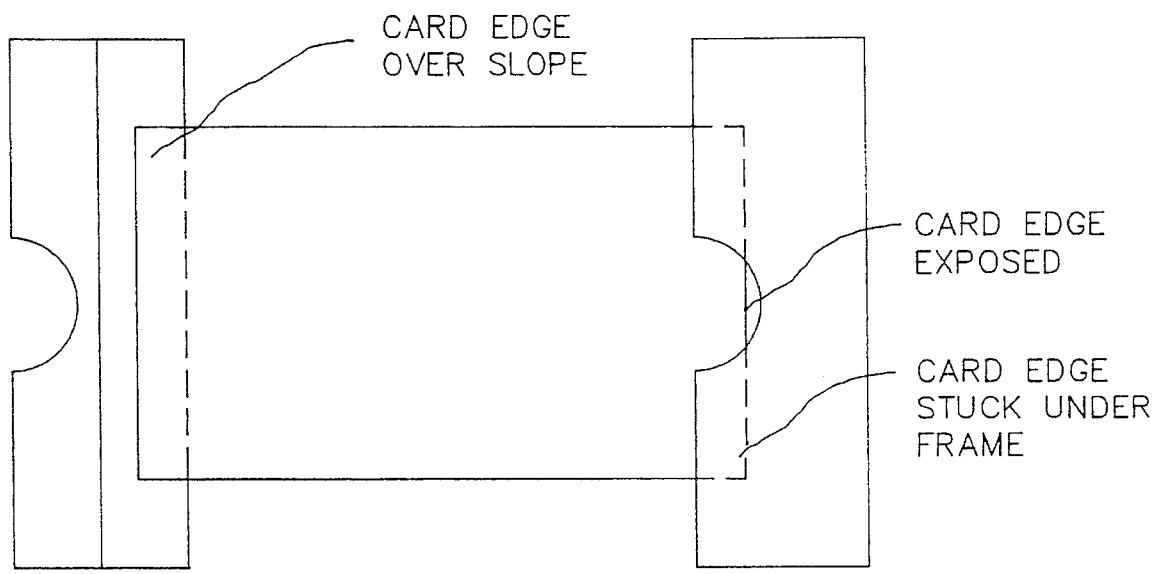

FIG. 4(C) is a plan view of one card stuck under the frame.

Figure 5:
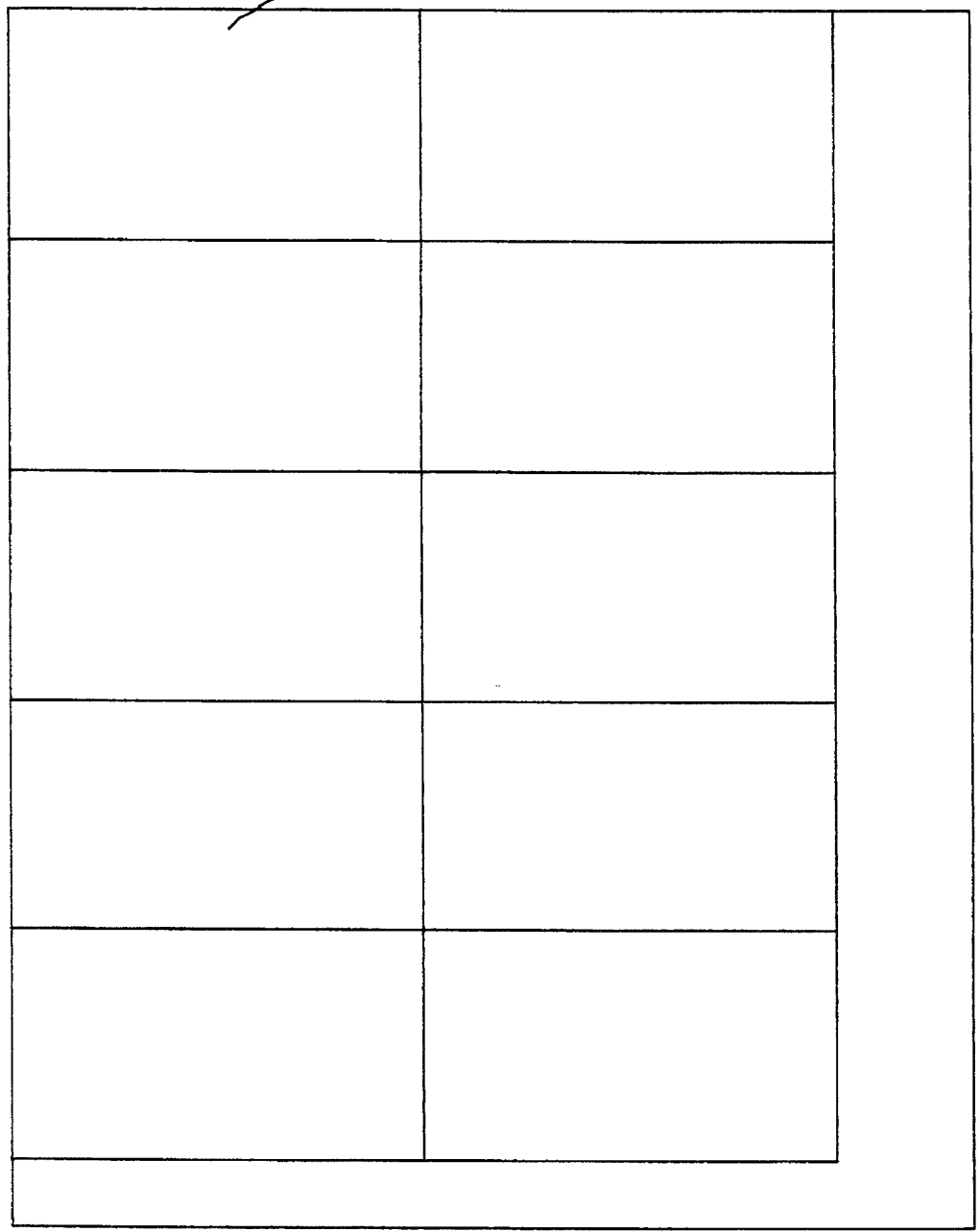

FIG. 5 is a plan view of 10 cards located on a original setting glass plate or a glass platen of a conventional photocopy machine/electronic flat-bed scanner as per previous art.

REFERENCE NUMERALS IN DRAWINGS

1 Hold down cover
2 Hinge of cover
3 Photocopier/electronic flat-bed scanner
4 Frame for setting originals/cards.
5 Original setting glass plate/glass platen.
6 Electrostatically active plastic film,
7 Slope
8 Sharp edge
9 Apertures for cards/originals
10 Semi-circular opening
11 Small original/card,

DESCRIPTION—FIGS. 1 TO 4

Figure 1:
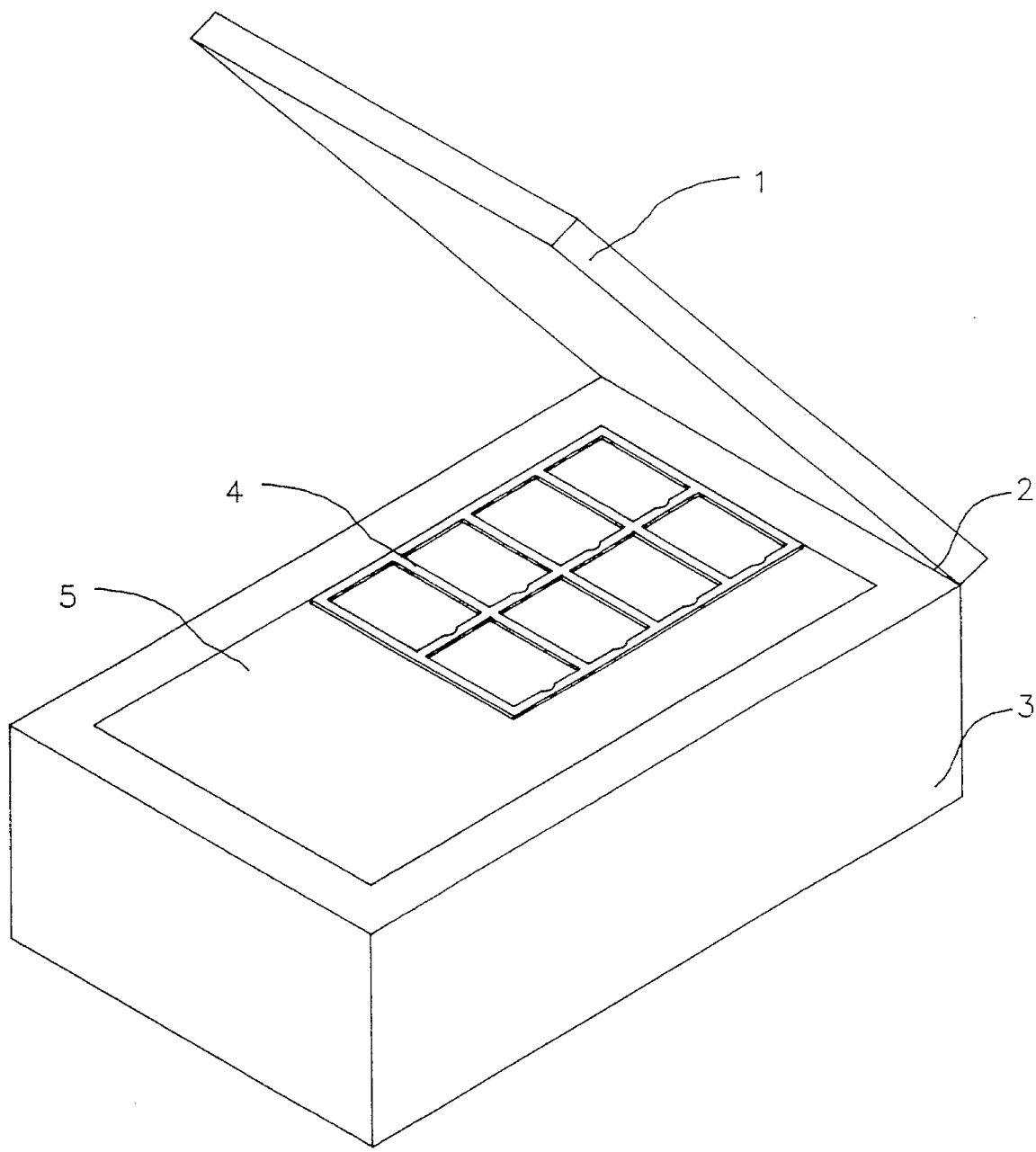
FIG. 1 is a perspective view of the accessory frame of the present invention, mounted on a photocopy machine/electronic flat-bed scanner.

A typical first embodiment of the original setting accessory frame 4, of the present invention is illustrated in FIG. 1, as if in mounted ready for operation, on the original setting glass plate/glass platen 5 of photocopier/electronic flat-bed scanner 3 with the hold-down cover 1 in the open position. Hold-down cover 1 is hinged to the body of 3 by means of a hinge 2. The present invention original setting accessory frame 4 is illustrated in greater detail in FIG. 2 as its first preferred embodiment, with eight rectangular predetermined apertures 9 to facilitate copying on to standard copy paper of size 8.5"×11". Each rectangular aperture in this embodiment is intended to accommodate one small original 11, say a business card of U.S. standard size 2" wide by 3.5" long, with the printed/engraved matter face down for copying/scanning operation. One such original 11 is shown in position, accommodated in the bottom left rectangular aperture 9. Further each aperture 9 is bounded by 4 wall edges forming part of the overall frame 4, to locate one card 11, restraining it from shifting or blown away by the induced air turbulence while closing the cover 1. The two lengthwise walls as well as one of the widthwise walls, the one with a semi-circular opening 10, of each aperture, offer vertical edges, to facilitate restraint to lateral movement of card. The other widthwise wall, the fourth, provides a slope 7 with a sharp edge 8 to facilitate restraint to lateral movement of card as well as to facilitate easy and quick retrieval of card after copying/scanning as shown in detail under FIG. 4(A) and (B). The dimension in between the lengthwise walls as well as that of the widthwise walls has necessarily to be predetermined for a particular standard sized card to facilitate quick location in the aperture 9 and at the same time provide restraint to lateral movement and also facilitate easy and quick removal. Thus for the first preferred embodiment for copying/scanning U.S. standard business cards of size 2"×3.5", the distance between the lengthwise walls is limited to between 2.11" to 2.15" for 2" width card, to facilitate quick location and offer restraint, and that of the widthwise walls, to between to 3.45" to 3.47" for 3.5". It will be noticed that the latter dimension is more accurate i.e. a stricter tolerance of only 0.02" for a length of 3.47". To amplify further this latter aspect, the distance between the widthwise wall containing the semicircular opening 10, and the tip of the sharp edge 8 should not exceed 3.47" for a standard card length of 3.5" so that when the standard card of 3.5" long is located in the aperture 9 of the frame 4, one edge of the card 11 will lie at the bottom of aperture butting against the widthwise vertical edged wall containing semicircular opening 10 while the other edge will perforce lie on slope 7 in a slanting position as shown in FIG. 4(A) and (C). When the card 11 is required to be retrieved out of the aperture 9, all that is necessary is to press a finger lightly on the card 11 and slide the card 11 over the slope 7 in the retrieval direction shown by an arrow in FIG. (A). FIG. 4(B) shows how the card edge slides over the slope 7 and presents itself to facilitate easy pick-up. Under a rare contingency of a card 11 getting stuck under the frame 4 with the card edge over slope 7 as shown in FIG. 4(C), it can still be slid out of the slot over the slope 7 by pushing with a finger nail, at the card edge exposed by the semicircular opening 10. Thus by limiting the dimension to aforesaid 3.47" maximum for a card of length of 3.5", an infelllble means of positive and quick retrieval of the card is provided for. It is needless to point out that this novel feature could be applied to any other size of card by limiting the length or width of the card slot to a dimension less than the length or width of the card proper, depending on the direction in which the card is to be slid out of a slot over a slope similar to slope 7 or over an edge if a slope cannot be provided due to some other consideration or considerations for instance a thin frame, card or paper. A layer of thin electrostatically active plastic film 6 available in trade under the generic description "static cling" is stuck with a suitable adhesive for the particular quality of plastics, to the underside of all the lengthwise and widthwise walls of the frame. This film 6 active with static electricity, is attracted and adheres to the original setting glass plate/glass platen by virtue of the said static electricity and therefore, would be in intimate contact with the original setting glass plate/glass platen of the photocopy/electronic flat-bed scanner, when the frame assembly is mounted in position for copying/scanning, and lightly pressed by fingers on the upper surface of the frame. The said frame thus is able to adhere to the original setting glass platen and remain stationary, and withstand the lateral and longitudinal forces usually encountered when the small originals are located into and later removed from the apertures 9 of the accessory frame during the copying/scanning operations. At the same time the adherant quality Ic such as to prove easy for the frame to be pried up when it is desired to remove it altogether from the glass platen without disfiguring, or leave traces on, the smooth surface of the glass platen as to enable the devices to be reverted to ordinary mode of operations i.e. copying/scanning of big originals, forthwith.

A second embodiment of the original setting accessory frame is shown in detail, in FIG. 3, intended to accommodate 10 originals/business cards U.S. standard size 2"×3.5" to copy on to standard size copy paper of size 8.5"×11". Reference numerals 4,6,7,8,9 and 10 designate the same items as in FIG. 2, except that the slope 7 and sharp edge 8 are continuous without being broken by the six intermediate lengthwise walls of the 8 apertures as in FIG. 2. In fact the space vacated by these 6 walls has been utilised to accommodate 2 more cards, totalling 10 cards. Similarly the reference numerals 8,10 and 11 in FIGS. 4(A),(B),(C) and reference numerals 5 and 11 in FIG. 5, designate the same items as in FIGS. 1 and 2.

OPERATION—FIGS. 1,2,4

The manner of using the present invention, the original setting frame 4 for copying/scanning is to first place it lightly, its flat surface with film 6 down on the original setting glass plate/glass platen 5 of a photo copier/electronic flat-bed scanner 3 with its hold-down cover 1 in open position, aligning the outer right-angled edges of the frame with the designated right-angled edges of the machine. Lightly press the top surface of frame all over, to make the frame adhere to the glass plate/glass platen to be able to withstand and avoid lateral or longitudinal movements while locating or retrieving the originals in or out of the apertures of the frame. Locate the first batch of eight small originals/cards of size 2"×3.5" in the eight apertures 9 of the frame, one in each with material to be copied face down with one wide edge of card butting against the vertical walled width edge containing semicircular opening 10. By virtue of limiting the length of the aperture 9, the other wide edge of card will perforce locate itself on the slope 7 of the other widthwise wall of the aperture as shown in FIG. 4(A). Close the hold-down cover and copy/scan the image of the eight originals on to a copy paper of standard size 11"×8.5" or transfer the scanned image of eight cards to the personal computer data bank as the case may be. Keeping the cover 1 in open position retrieve each card by pressing *lightly the card* by a finger and sliding the card in the direction shown by arrow in FIG. 4(A) and pick up the card by the edge shown by arrow in FIG. 4(B) and stack the eight cards already copied/scanned. Further eight cards of the second batch can now be located for copying/scanning and so on. Under a rare contingency of a card 11 getting stuck under the frame 4 with the card edge over slope 7 as shown in FIG. 4(C), it can still be slid out of the aperture over the slope 7 by pushing with a finger nail, at the card edge exposed by the semicircular opening 10. After the campaign of copy/scanning small originals/cards is over, the adherant frame can be pried upwards to remove it altogether from the devices without disfiguring, or leave traces on, the smooth surface of the glass platen as to enable the devices to be reverted to ordinary mode of operations i.e. copying/scanning of big originals, forthwith.

SUMMARY, RAMIFICATION, AND SCOPE

Accordingly the reader will see that the original setting frame of the present invention, acquired as an extremely low cost accessory, can be set firmly on a standard, conventional, photocopier or electronic flat-bed scanner for a special campaign to copy/scan multiple, sheetlike small originals like post cards, business cards in batches, easily, without any special skill conveniently and quickly, and revert back to ordinary mode of operations i.e. copying/scanning of big originals, forthwith, by removing the frame from the glass plate/glass platen without, effort, disfiguring or leaving traces on the glass plate/glass platen, on which it was set earlier. Further more, the present invention has the additional advantages in that it can be produced by the injection moulding using opaque white coloured, common plastic materials like polycarbonate, acronitrite-butadiene-styrene, nylon 6 high impact styrene etc.

its use does not need any modification to the standard, conventional, photocopier/electronic flat-bed scanner as it is used as a simple accessory only.

the second embodiment FIG. 3 of the present invention in addition can be used to photocopy a batch of ten business cards of U.S. standard size 2"×3.5" to copy the textual material on each of them directly on to an address label sheet 11"×8.5" size containing ten numbers of self adhesive copier address lables size 2"×4", sold under the brand name "PRESAPLY" by M/s Dennison Stationary Products; 300, Howard Street; Framingham; Mass. 01701 U.S.A or similar. Other embodiments of this invention, can be used for different sized labels and different brands of similar label sheets. At present these labels are used by laboriously typing the textual material on a personal computer or a typewriter for creating a master address sheet and later photocopying the master address sheet on to the appropriate size of address label sheets to run off as many copies needed. With the use of the present accessory frame the laborious typing can be avoided and the production of the intermediate master address sheet can also be avoided.

Bigger business cards greater than the present standard size of 2"×3.5" is in the realm of possibility. So also are the bigger sizes of originals to be copied/scanned in the photocopiers/electronic flat-bed scanners, from the present sizes of 8.5"×11" and 8.5"×14". Although the description above contains many specificities, these should not be construed as limiting the scope of the invention but as merely providing illustrations of some of the presently preferred embodiments of this invention.

We claim:

1. An accessory frame for a copying device having a hold down cover and original setting glass platten wherein the platen is selected from a group comprising of electrophoto and electronic flatbed types each facilitating copying of plural sheet-like small originals, said accessory frame comprising:

(a) a sheet element having plural predetermined apertures wherein the edges of the apertures are configured to slope inwards and form a slope ending in a sharp edge and wherein the sheet element has a level under surface;

(b) means to easily locate and remove said small originals;

(c) an electrostatically active film for removably adhering said accessory frame steadfastly on the glass platen wherein the film is permanently attached to the under surface of the sheet element; and, (d) an appropriate adhesive suitable for said electrostatically active film to permanently attach the film to the under surface of the sheet element.

2. The accessory frame of claim 1 wherein said sheet element is composed of thermosetting plastic material selected from a group comprising of polycarbonate, acrylonitrille-butadine-styrene, and high impact polystyrene.

3. The accessory frame of claim 1, wherein the overall boundary of the sheet element is rectilinear and said plural predetermined apertures are all rectangular where all the side edges of each aperture provide said slope and said sharp edge and further having means for restraining said small originals from shifting due to air turbulence created when the hold-down cover is closed or opened and means for easily removing the small originals from the said predetermined apertures after a copying operation.

4. The accessory frame of claim 3, wherein the distance between both pairs of opposite sharp edges of each predetermined rectangular aperture is limited to a close tolerence on the order of a few hundredths of an inch less than the corresponding dimensions of standard sized small originals to be placed in the aperture and further having means for locating a leading edge of the small original on said slope while a corresponding trailing edge of the small original parallel to the leading edge thrusts against a parallel opposite sharp edge on the opposite side of the aperture whereby said leading edge can slide easily over said slope for removal from the aperture.

5. The accessory frame of claim 4, wherein semicircular recess means are provided in said sharp edges of said predetermined aperture for making removal of the trailing edge of the small original easier should the trailing edge get stuck between said accessory frame and said glass platten while the leading edge of the same small original is located on the slope on the opposite side of the aperture.

6. The accessory frame of claim 1, wherein the overall boundary of the sheet element is rectilinear and said plural predetermined apertures are all rectangular with at least one of the sides of each aperture providing said slope and said sharp edge while the remaining sides of the aperture provide vertical edges; and further having means for restraing the small originals from the effects of shifting air turbulence caused by opening and closing the hold-down cover and means for removing the small originals from the aperture upon completion of copying.

7. The accessory frame of claim 6, wherein the distance between the sharp edge and the corresponding parallel opposite vertical edge of said aperture is limited to a close tolerance on the order of a few hundredths of an inch less than a corresponding dimension of standard sized small originals to be placed in the apertures thereby ensuring location of a leading edge of the small original on said slope and the corresponding trailing edge of the small original against the opposite vertical edge of the aperture and facilitating easy removal of the small original from the aperture by sliding the original over the slope.

8. The accessory frame of claim 7, wherein a semicircular recess means is provided in the vertical edges opposite said sharp edges of said predetermined aperture for easily removing a trailing edge of a small original which gets stuck between the accessory frame and the glass platten while the leading edge of the corresponding small original is on the slope opposite the vertical edge.

* * * * *